(12) United States Patent
Yoshida et al.

(10) Patent No.: US 12,368,352 B2
(45) Date of Patent: Jul. 22, 2025

(54) MOTOR DEVICE

(71) Applicant: MITSUBA Corporation, Gunma (JP)

(72) Inventors: Yasushi Yoshida, Gunma (JP); Daiki Yamamoto, Gunma (JP); Yutaro Jo, Gunma (JP)

(73) Assignee: MITSUBA Corporation, Gunma (JP)

( * ) Notice: Subject to any disclaimer, the term of this patent is extended or adjusted under 35 U.S.C. 154(b) by 261 days.

(21) Appl. No.: 18/168,516

(22) Filed: Feb. 13, 2023

(65) Prior Publication Data

US 2023/0353022 A1  Nov. 2, 2023

(30) Foreign Application Priority Data

Mar. 29, 2022 (JP) ................. 2022-053273

(51) Int. Cl.
| | |
|---|---|
| *H02K 11/40* | (2016.01) |
| *H02K 7/11* | (2006.01) |
| *H02K 7/116* | (2006.01) |
| *B60J 7/043* | (2006.01) |
| *E05F 15/643* | (2015.01) |

(52) U.S. Cl.
CPC .......... *H02K 11/40* (2016.01); *H02K 7/1166* (2013.01); *B60J 7/043* (2013.01); *E05F 15/643* (2015.01); *E05Y 2201/434* (2013.01); *E05Y 2800/422* (2013.01); *E05Y 2900/542* (2013.01)

(58) Field of Classification Search
CPC .. H02K 11/40; H02K 7/1166; H02K 11/0141; H02K 5/24; H02K 5/225; H02K 11/0094; B60J 7/043; E05F 15/643; E05Y 2201/434; E05Y 2800/422; E05Y 2900/542
See application file for complete search history.

(56) References Cited

U.S. PATENT DOCUMENTS

| | | | | |
|---|---|---|---|---|
| 2004/0012296 | A1* | 1/2004 | Sakai | H02K 11/40 310/239 |
| 2016/0049844 | A1* | 2/2016 | Yasumoto | H02K 11/21 310/71 |

FOREIGN PATENT DOCUMENTS

JP  2015053803  3/2015

* cited by examiner

*Primary Examiner* — Thomas Truong
(74) *Attorney, Agent, or Firm* — JCIPRNET

(57) ABSTRACT

In a motor device, since a first conductive plate and a second conductive plate are provided to cover a housing, it is possible to prevent electrical noise from being radiated to the outside of the housing, and thus it is possible to take more sufficient countermeasures against electrical noise. Therefore, it is possible to further suppress adverse effects on in-vehicle equipment such as a car audio. In addition, since the first conductive plate and the second conductive plate are respectively electrically connected and collectively fixed by the first fixing member and the second fixing member, the assemblability of the sunroof motor can also be improved.

4 Claims, 12 Drawing Sheets

MOTOR DEVICE

CROSS-REFERENCE TO RELATED APPLICATION

This application claims the priority benefit of Japan application serial no. 2022-053273, filed on Mar. 29, 2022. The entirety of the above-mentioned patent application is hereby incorporated by reference herein and made a part of this specification.

BACKGROUND

Technical Field

The disclosure relates to a motor device including a speed reduction mechanism which reduces speed of rotation of a rotating shaft.

Related Art

Conventionally, a motor device with a speed reduction mechanism capable of obtaining a large output despite its small size has been adopted as an in-vehicle motor serving as a drive source for a sunroof device or the like. Accordingly, it is possible to easily mount the motor device in a narrow space in the roof of the vehicle. Such a motor device is described in Patent Document 1 (Japanese Patent Application Laid-Open No. 2015-053803), for example.

The motor device described in Patent Document 1 includes: a brushed motor including a rotating shaft rotated by supply of a drive current; and a speed reduction mechanism which reduces speed of rotation of the rotating shaft to increase torque and outputs the torque-increased rotational force to the outside.

A ground terminal is provided in the vicinity of the brushes forming the motor, so that electrical noise radiated from the brush portion is released to the ground via the ground terminal. Therefore, it is possible to prevent the electrical noise from being radiated to around the motor device, and thus suppress adverse effects on a car audio, an in-vehicle controller, etc.

However, in the motor device described in Patent Document 1, a worm is rotatably accommodated inside a casing made of resin, and if the worm is made of metal, there is a risk that electrical noise will propagate through the worm and be radiated from the worm to the outside of the casing. In other words, in the motor device described in Patent Document 1, countermeasures against electrical noise were not sufficient.

SUMMARY

In an aspect of the disclosure, a motor device includes a motor, a speed reduction mechanism, and a housing. The motor includes a rotating shaft. The speed reduction mechanism reduces speed of rotation of the rotating shaft. The housing accommodates the speed reduction mechanism. The motor device further includes a plurality of conductive plates and a fixing member. The plurality of conductive plates cover the housing to prevent electrical noise from being radiated to outside of the housing. The fixing member is provided at the housing, electrically connects each of the plurality of conductive plates, and collectively fixes the plurality of conductive plates to the housing.

According to the disclosure, by providing the plurality of conductive plates to cover the housing, it is possible to prevent electrical noise from being radiated to the outside of the housing, and thus it is possible to take more sufficient countermeasures against electrical noise. Therefore, it is possible to further suppress adverse effects on in-vehicle equipment such as a car audio. In addition, since the plurality of conductive plates are respectively electrically connected and collectively fixed by the fixing member, the assemblability of the motor device can also be improved.

DESCRIPTION OF THE EMBODIMENTS

Embodiments of the disclosure provide a motor device capable of further suppressing adverse effects on in-vehicle equipment (car audio, etc.) by taking more sufficient countermeasures against electrical noise.

Embodiment 1

Embodiment 1 of the disclosure will be described in detail below with reference to the drawings.

Figure 1:
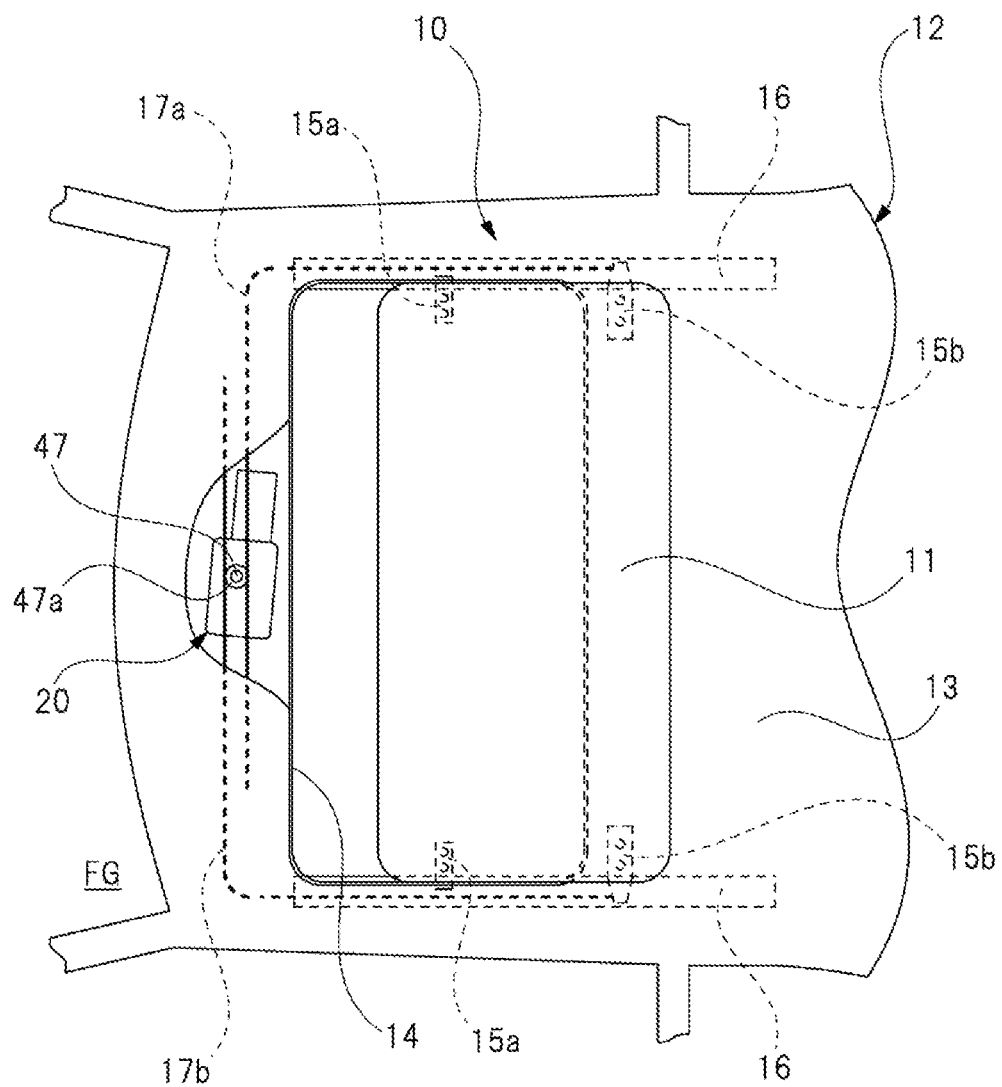
FIG. 1 is a schematic view showing a sunroof device installed at a roof of a vehicle.
Figure 2:
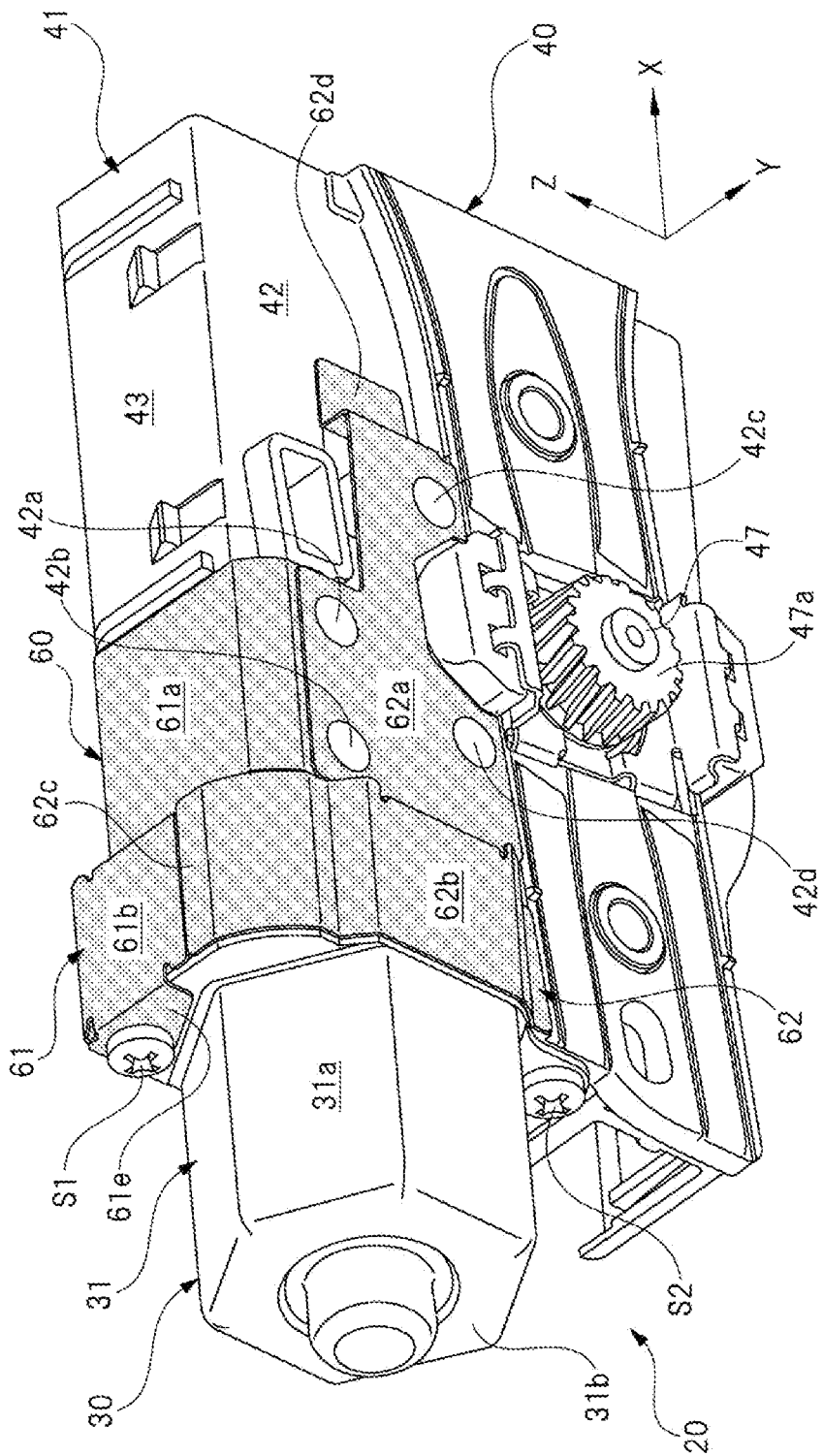
FIG. 2 is a perspective view showing an output gear side of a sunroof motor.
Figure 3:
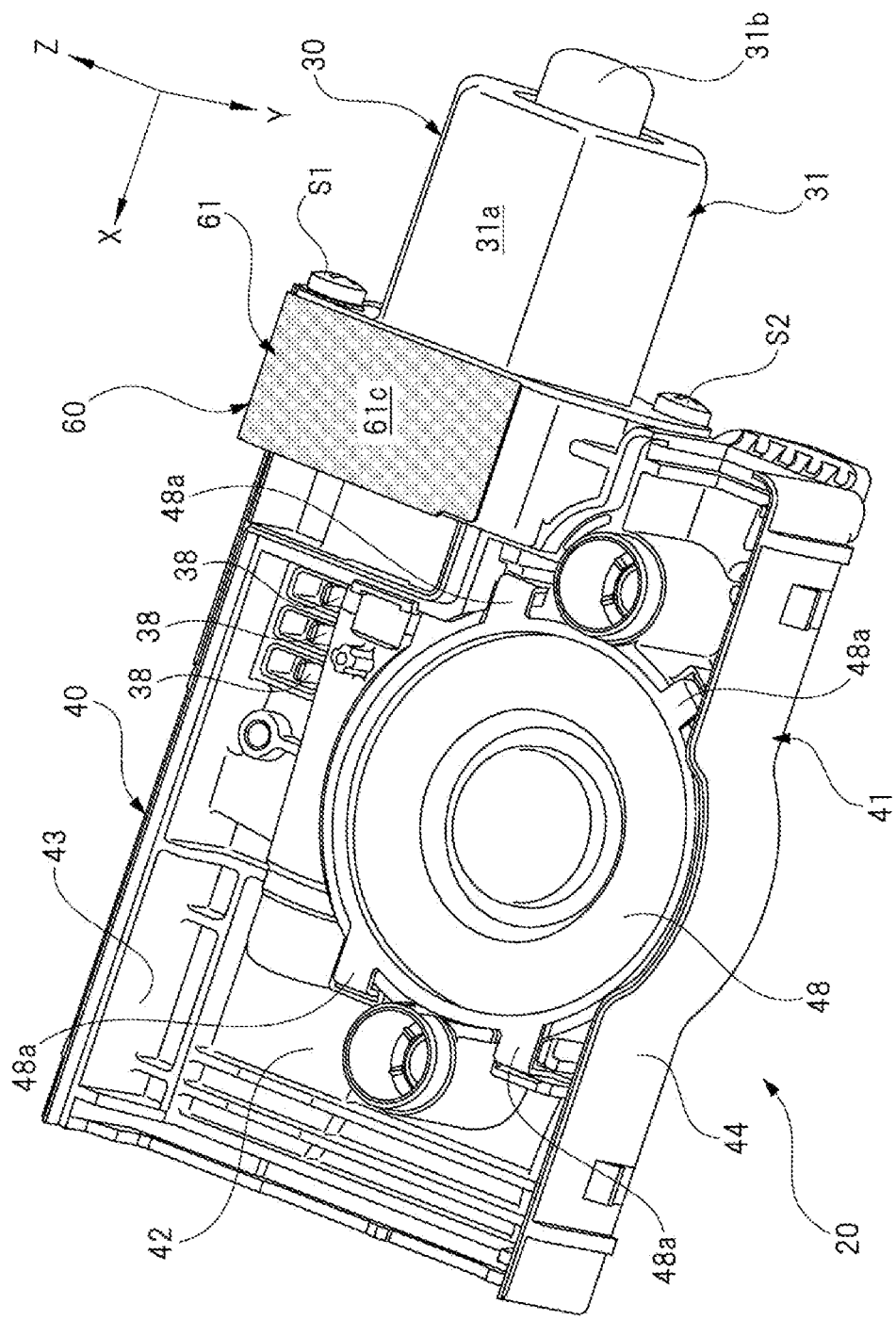
FIG. 3 is a perspective view showing a cover member side of the sunroof motor.
Figure 4:
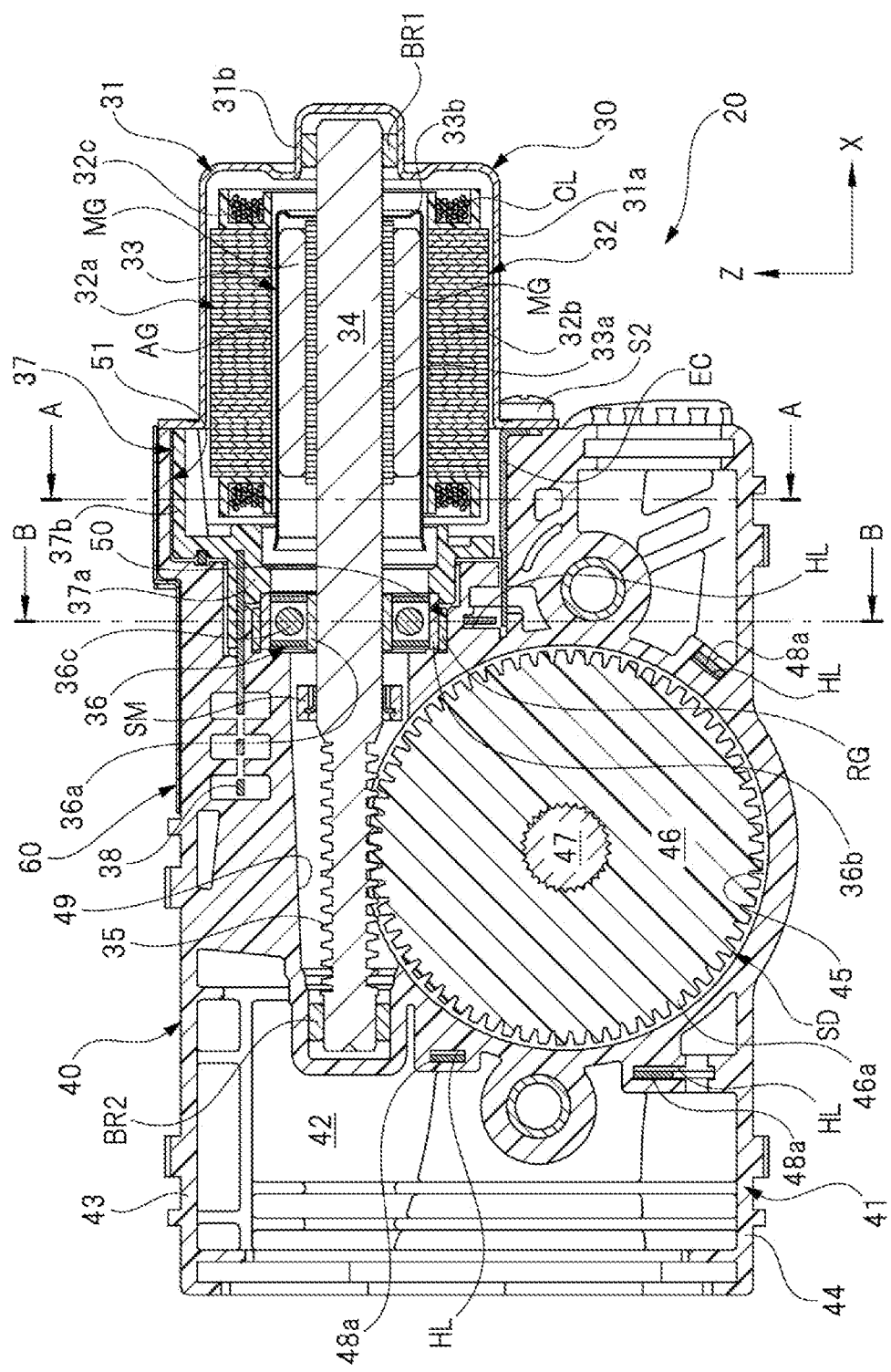
FIG. 4 is a cross-sectional view of the sunroof motor along an axial direction of a rotating shaft.
Figure 5:
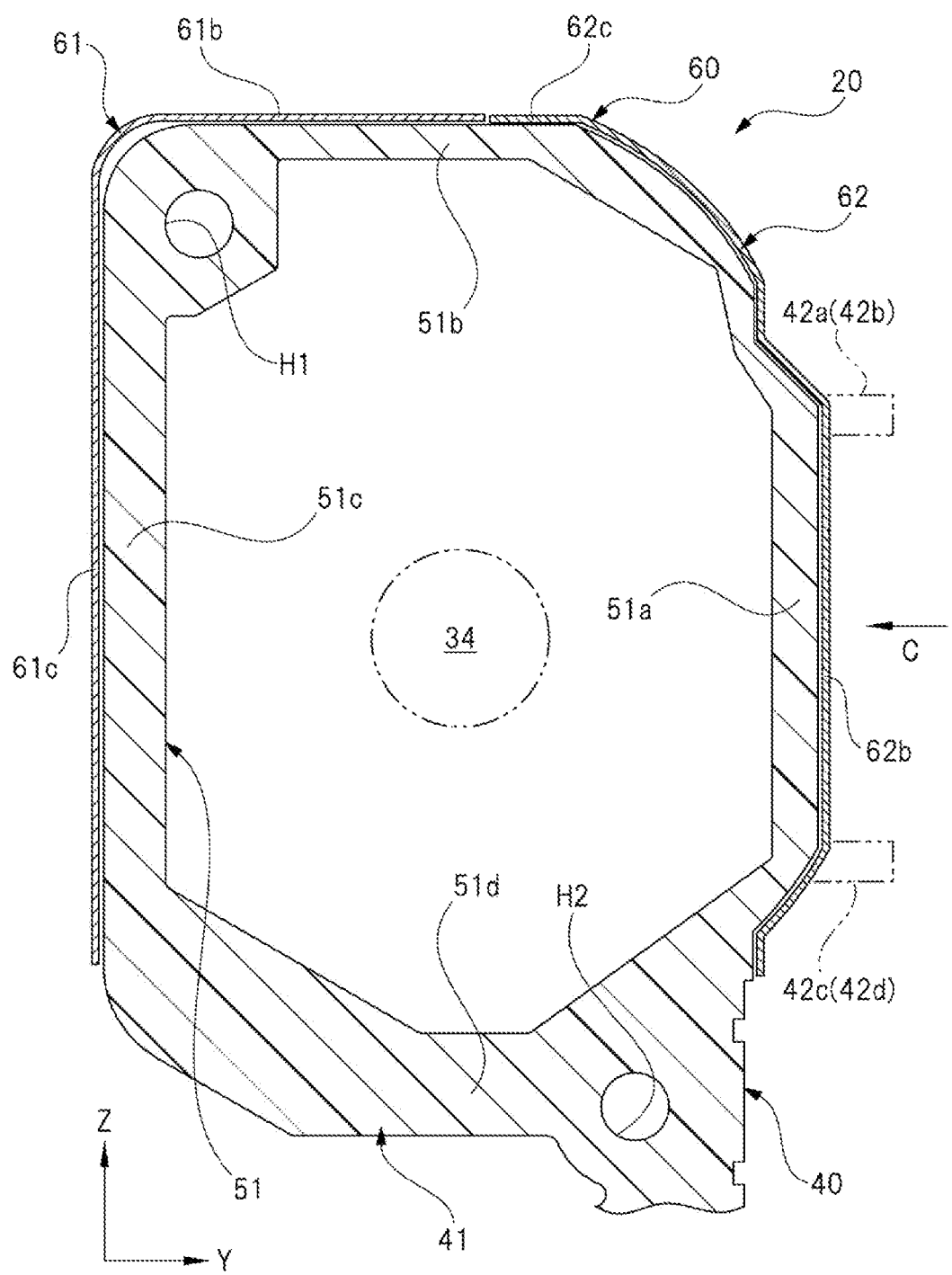
FIG. 5 is a partial cross-sectional view omitting the inside along line A-A in FIG. 4.
Figure 6:
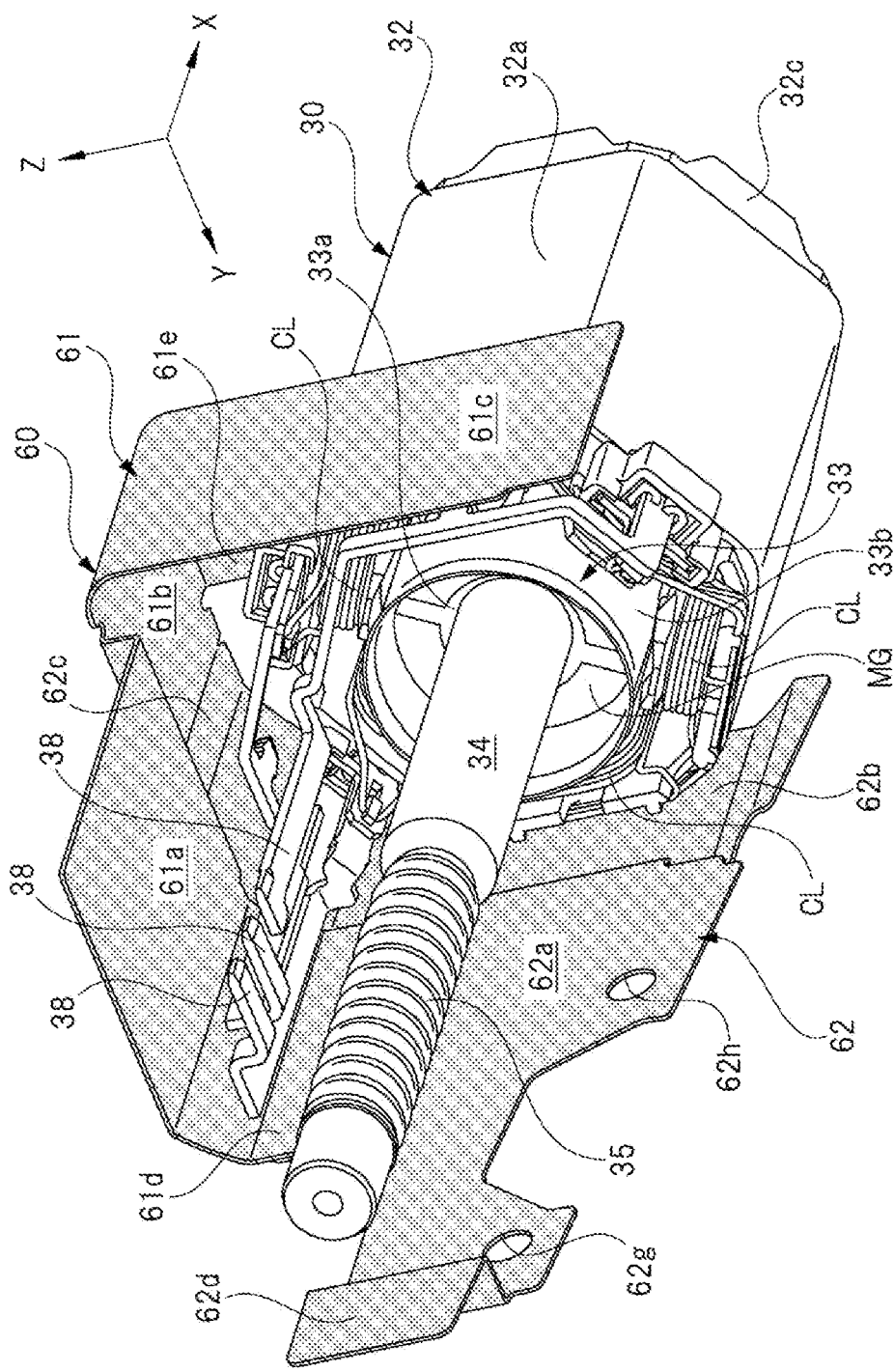
FIG. 6 is a perspective view illustrating a positional relationship between an electric motor part, a first conductive plate, and a second conductive plate.
Figure 7:
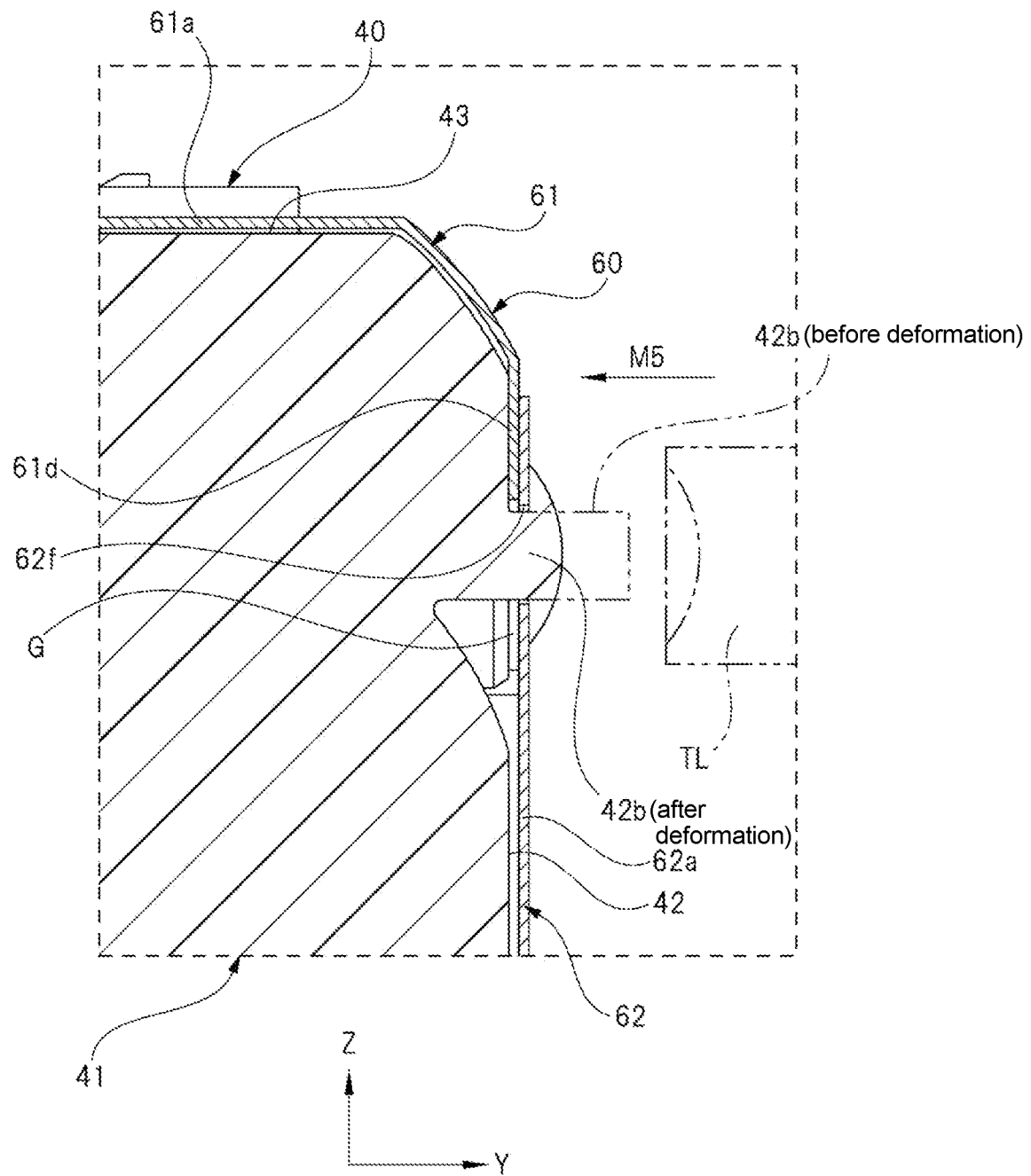
FIG. 7 is a partially enlarged cross-sectional view along line B-B in FIG. 4.
Figure 8:
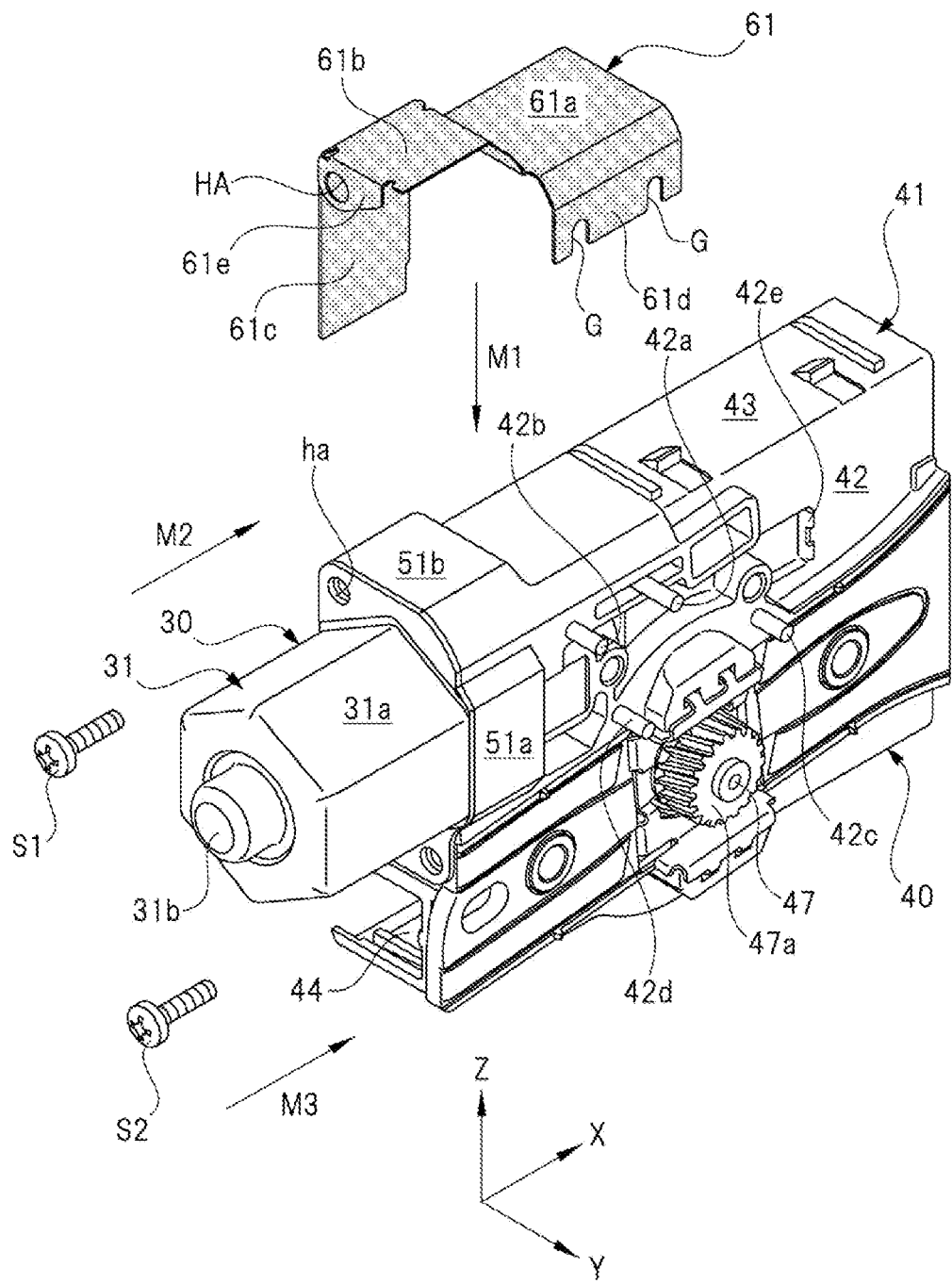
FIG. 8 is a perspective view showing a procedure for mounting the first conductive plate to a gear case.
Figure 9:
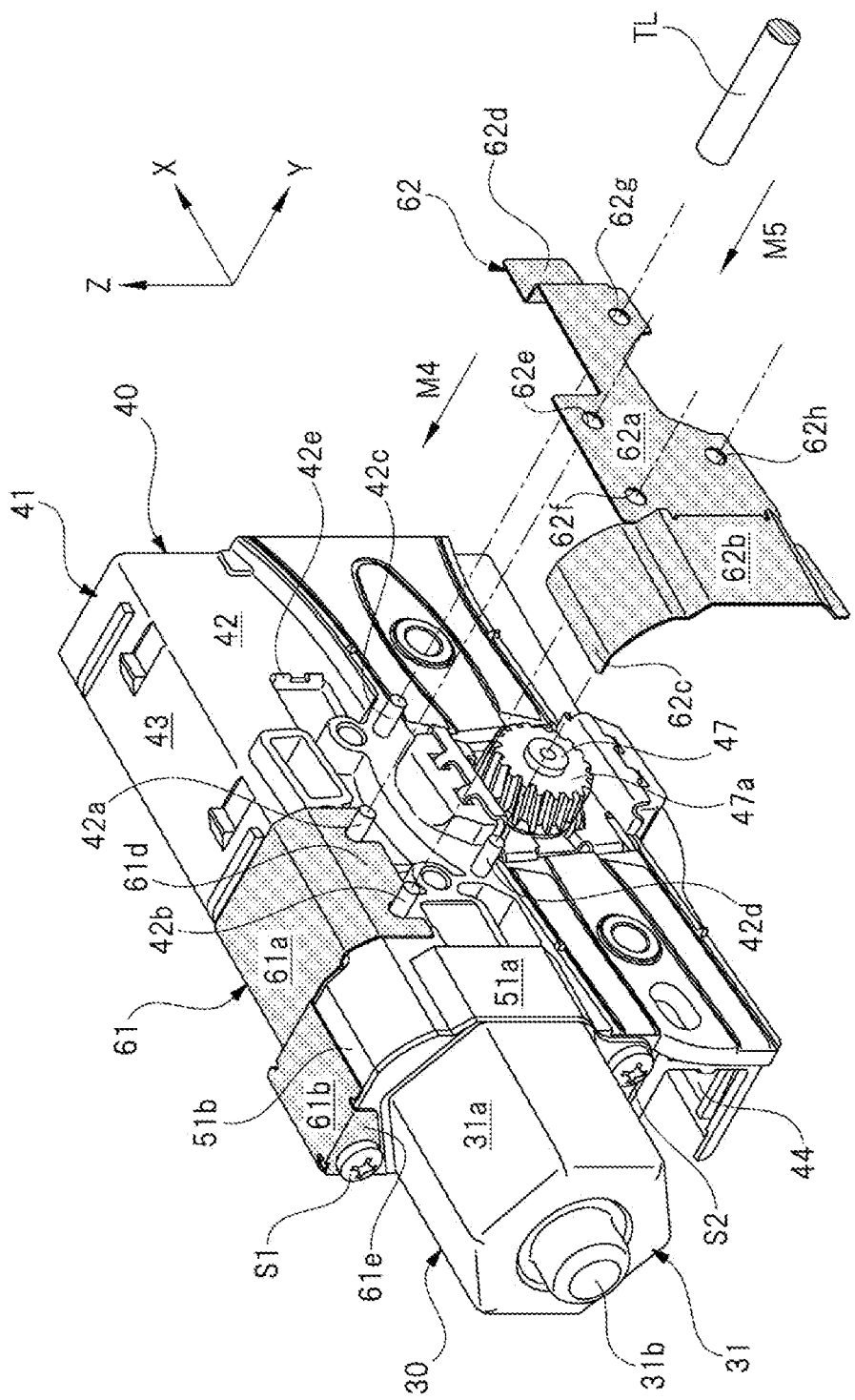
FIG. 9 is perspective view showing a procedure for mounting the second conductive plate to the gear case.

FIG. 1 is a schematic view showing a sunroof device installed at a roof of a vehicle. FIG. 2 is a perspective view showing an output gear side of a sunroof motor. FIG. 3 is a perspective view showing a cover member side of the sunroof motor. FIG. 4 is a cross-sectional view of the sunroof motor along an axial direction of a rotating shaft. FIG. 5 is a partial cross-sectional view omitting the inside along line A-A in FIG. 4. FIG. 6 is a perspective view illustrating a positional relationship between an electric motor part, a first conductive plate, and a second conductive plate. FIG. 7 is a partially enlarged cross-sectional view along line B-B in FIG. 4. FIG. 8 is a perspective view showing a procedure for mounting the first conductive plate to a gear case. FIG. 9 is perspective view showing a procedure for mounting the second conductive plate to the gear case.

[Outline of Sunroof Device]

As shown in FIG. 1, a sunroof device 10 includes a roof panel 11. The roof panel 11 opens and closes an opening 14 formed at a roof 13 of a vehicle 12. A pair of shoes 15a and 15b are fixed to each of vehicle width direction two sides (upper and lower sides in FIG. 1) of the roof panel 11. A guide rail 16 extending in the front-rear direction (left-right direction in FIG. 1) of the vehicle 12 is fixed to each of vehicle width direction two sides of the opening 14 in the roof 13. With the pair of shoes 15a and 15b being guided by the corresponding pair of guide rails 16, respectively, the roof panel 11 moves in the front-rear direction of the vehicle 12.

One ends of drive cables 17a and 17b attached with gears are connected to the respective shoes 15b arranged on the rear side (right side in FIG. 1) of the vehicle 12. Another ends of the drive cables 17a and 17b are routed to the vehicle 12 front side (left side in FIG. 1) of the opening 14.

A sunroof motor (motor device) 20 is provided on the vehicle 12 front side of the opening 14 and inside the roof 13 between a windshield FG and the roof 13. The another ends of the pair of drive cables 17a and 17b are meshed with an output gear 47a (see FIG. 2) provided at the sunroof motor 20. When the sunroof motor 20 is driven, the pair of drive cables 17a and 17b move in their longitudinal directions in directions opposite to each other. Accordingly, the roof panel 11 is pushed and pulled by the pair of drive cables 17a and 17b via the pair of shoes 15b to open and close the opening 14.

[Outline of Sunroof Motor]

As shown in FIG. 2 to FIG. 4, the sunroof motor 20 includes an electric motor part (motor) 30 and a speed reduction mechanism part 40. The electric motor part 30 and the speed reduction mechanism part 40 are firmly connected to each other and integrated (unitized) by a pair of first fastening screw S1 and second fastening screw S2. Herein, the first fastening screw S1 corresponds to a fastening member in the disclosure.

[Electric Motor Part]

The electric motor part 30 is a motor without brushes, i.e., a brushless motor, and includes a yoke 31 formed in a bottomed tubular shape by deep-drawing a magnetic body such as a steel plate. The yoke 31 includes a side wall part 31a that forms an outer shell of the electric motor part 30 and has a substantially regular hexagonal cross section. One axial side (left side in FIG. 2, right side in FIG. 3 and FIG. 4) of the side wall part 31a is closed by a stepped bottom wall part 31b.

[Stator]

As shown in FIG. 4, a stator 32 is accommodated inside the yoke 31. The stator 32 includes a stator core 32a formed by laminating a plurality of thin steel plates (magnetic bodies). The stator core 32a is fixed to the yoke 31 and includes a total of six teeth 32b (not shown in detail). Coils CL of three phases including a U-phase, a V-phase, and a W-phase are respectively wound around the teeth 32b via an insulator (insulating member) 32c.

[Rotor]

A rotor 33 is rotatably provided on the radially inner side of the stator 32 with a predetermined gap AG (air gap) present therebetween. The rotor 33 includes a core body 33a formed in a substantially tubular shape. The core body 33a is formed by laminating a plurality of thin steel plates (magnetic bodies), and a total of four permanent magnets MG (only two are shown in the figures) are fixed by an adhesive or the like to the radially outer side of the core body 33a. Specifically, the permanent magnets MG are arranged at equal intervals (90° intervals) in the circumferential direction of the core body 33a.

Further, the radially outer side of each permanent magnet MG fixed to the core body 33a is covered with a magnet holder 33b that is formed by a thin stainless steel plate or the like into a substantially tubular shape. The magnet holder 33b prevents the permanent magnet MG from falling off from the core body 33a. Accordingly, even if the rotor 33 rotates at high speed, the permanent magnets MG do not fall off from the core body 33a due to the centrifugal force generated at that time.

A rotating shaft 34 is fixed to the radially inner side of the core body 33a by press-fitting. The rotating shaft 34 is made of a round steel rod (magnetic body) to ensure sufficient strength. An axial base end side (right side in FIG. 4) of the rotating shaft 34 is arranged inside the yoke 31 and is rotatably supported by a first metal (radial bearing) BR1 mounted at the bottom wall part 31b of the yoke 31. On the other hand, an axial tip side (left side in FIG. 4) of the rotating shaft 34 is arranged inside a housing 41 that forms the speed reduction mechanism part 40 and is rotatably supported by a second metal (radial bearing) BR2 mounted at a worm accommodating part 49 of the housing 41.

A worm 35 that forms a speed reduction mechanism SD is integrally provided on the axial tip side of the rotating shaft 34. That is, the worm 35 is also made of a round steel rod. Accordingly, the rigidity of the worm 35 is increased, the worm 35 is prevented from bending, and thus reliable meshing with a worm wheel 46 is ensured.

Further, a ball bearing 36 is provided at an axial middle part of the rotating shaft 34. Specifically, the ball bearing 36 includes an inner race (inner ring) 36a that is formed by steel into a substantially tubular shape, and an outer race (outer ring) 36b that is formed by steel into a substantially tubular shape in the same manner as the inner race 36a and has a larger diameter than the inner race 36a. In the radial direction of the ball bearing 36, a plurality of balls (steel balls) 36c are provided between the inner race 36a and the outer race 36b.

Herein, the inner race 36a is fixed to the rotating shaft 34 by press fitting. That is, the inner race 36a rotates together with the rotating shaft 34. Further, as shown in FIG. 4, the outer diameter dimension of the rotating shaft 34 is larger than the outer diameter dimension of the worm 35. Accordingly, the ball bearing 36 can be press-fitted into the rotating shaft 34 from the worm 35 side in the axial direction of the rotating shaft 34.

A sensor magnet SM is attached between the worm 35 and the ball bearing 36 in the axial direction of the rotating shaft 34. The sensor magnet SM is used to control the rotational direction and the rotational speed of the rotating shaft 34. The ball bearing 36 is arranged between the sensor magnet SM and the core body 33a in the axial direction of the rotating shaft 34.

[Bearing Support Member]

Further, as shown in FIG. 4, the electric motor part 30 includes a bearing support member 37. The bearing support member 37 is made of a resin material such as plastic, and includes a support body 37a formed in a substantially annular shape and a mounting wall part 37b inserted and fitted into the housing 41.

The support body 37a of the bearing support member 37 supports the outer race 36b of the ball bearing 36 from the axial base end side (right side in FIG. 4) of the rotating shaft 34. The axial tip side (left side in FIG. 4) of the rotating shaft 34 of the outer race 36b is supported by a bearing mounting part 50 provided at the housing 41.

Thus, the outer race 36b of the ball bearing 36 is sandwiched between the housing 41 and the bearing support member 37 in the axial direction of the rotating shaft 34. Herein, by fixing the yoke 31 to the housing 41 with the first fastening screw S1 and the second fastening screw S2, the bearing support member 37 is fixed on the inner side of the housing 41 without rattling. That is, the bearing support member 37 is sandwiched between the housing 41 and the yoke 31.

A total of three conductive members (terminal members) 38 are mounted at the bearing support member 37 (see FIG. 6). These conductive members 38 are formed by brass or the like having excellent conductivity into a substantially rod shape, and longitudinal one sides thereof (right side in FIG. 6) are respectively electrically connected to the coils CL of the U-phase, the V-phase, and the W-phase (three phases). On the other hand, longitudinal other sides (left side in FIG. 6) of the conductive members 38 may be electrically connected to an external connector (not shown) provided on the vehicle 12 (see FIG. 1) side. Accordingly, a drive current is supplied to the three-phase coils CL of the sunroof motor 20 from an in-vehicle battery or the like, and the rotating shaft 34 is rotated in the forward direction or reverse direction.

Thus, in addition to the function of supporting the ball bearing 36, the bearing support member 37 further has a function of holding the total of three conductive members 38. Herein, in FIG. 6, illustration of the sensor magnet SM and the ball bearing 36 fixed to the rotating shaft 34, and illustration of the yoke 31 and the bearing support member 37 holding the total of three conductive members 38 are omitted.

[Speed Reduction Mechanism Part]

As shown in FIG. 2 to FIG. 4, the speed reduction mechanism part 40 includes a housing 41 that accommodates the speed reduction mechanism SD. The housing 41 is formed by a resin material such as plastic into a substantially flat rectangular parallelepiped shape, and includes a first wall part 42, a second wall part 43, and a third wall part 44. Among the first wall part 42, the second wall part 43, and the third wall part 44, the first wall part 42 occupies the largest proportion.

Herein, assuming that the axial direction of the rotating shaft 34 is the X-axis direction, the axial direction of an output shaft 47 orthogonal to the rotating shaft 34 is the Y-axis direction, and a direction orthogonal to both the rotating shaft 34 and the output shaft 47 is the Z-axis direction, the first wall part 42 is arranged on a Y-axis direction one side (near side in FIG. 2 and back side in FIG. 3 and FIG. 4) of the housing 41, the second wall part 43 is arranged on a Z-axis direction one side (upper side in FIG. 2 to FIG. 4) of the housing 41, the third wall part 44 is arranged on a Z-axis direction other side (lower side in FIG. 2 to FIG. 4) of the housing 41. Both the second wall part 43 and the third wall part 44 stand perpendicularly to the first wall part 42.

As shown in FIG. 4, a worm wheel accommodating part 45 is provided on the inner side of the housing 41. The worm wheel accommodating part 45 is arranged on the Z-axis direction other side, i.e., at a portion near the third wall part 44. The worm wheel 46 forming the speed reduction mechanism SD is rotatably accommodated inside the worm wheel accommodating part 45. Herein, the worm wheel 46 is made of a resin material such as plastic for weight reduction. A tooth part 46a is provided at the worm wheel 46, and the tooth part 46a is meshed with the worm 35 inside the housing 41.

That is, the speed reduction mechanism SD is a worm speed reducer that provides a relatively large speed reduction ratio. Specifically, in this embodiment, the speed reduction ratio of the speed reduction mechanism SD is "1:67". That is, at this speed reduction ratio, when the worm 35 rotates 67 times, the worm wheel 46 gradually makes one rotation.

Further, the axial base end side (Y-axis direction other side) of the output shaft 47 made of a round steel rod (magnetic body) is fixed to the center of rotation of the worm wheel 46. On the other hand, the output gear 47a with which the pair of drive cables 17a and 17b (see FIG. 1) are meshed is integrally provided on the axial tip side (Y-axis direction one side) of the output shaft 47.

Therefore, the high-speed rotation of the rotating shaft 34 is reduced by the speed reduction mechanism SD, and the rotational force that has been reduced in speed and increased in torque is transmitted to the pair of drive cables 17a and 17b via the output shaft 47 and the output gear 47a. The speed reduction mechanism SD is formed by the worm 35 and the worm wheel 46.

Herein, the worm wheel accommodating part 45 is opened (not shown) on the Y-axis direction other side, i.e., on a side opposite to the first wall part 42 side in the Y-axis direction. The opening portion of the worm wheel accommodating part 45 is closed with a cover member 48 (see FIG. 3) formed by pressing a steel plate (magnetic body).

The cover member 48 is formed in a substantially disc shape, and a total of four insertion legs 48a are integrally provided at an outer peripheral portion of the cover member 48. These insertion legs 48a extend toward the Y-axis direction one side, and as shown in FIG. 4, are inserted into insertion holes HL of the housing 41 in a come-off prevention state.

A longitudinal one side (left side in FIG. 4) of a grounding conductive member EC is electrically connected to one of the insertion legs 48a, and a longitudinal other side (right side in FIG. 4) of the grounding conductive member EC is electrically connected to the yoke 31. Therefore, radiation of electrical noise to the outside of the housing 41 from the axial base end side of the output shaft 47 is suppressed.

"Electrical noise" herein refers to high-frequency noise that is generated during operation of the sunroof motor 20 and is propagated to metal parts (magnetic bodies) provided inside the housing 41. When the electrical noise is radiated to the outside such as into the air, it may adversely affect in-vehicle equipment such as a car audio. Therefore, the electrical noise generated by the sunroof motor 20 is grounded (released) to a vehicle body (not shown) of the vehicle 12 as much as possible. The yoke 31 is electrically connected to the vehicle body via a metal motor bracket (not shown).

Further, as shown in FIG. 4, the worm accommodating part 49 is provided on the inner side of the housing 41. The worm accommodating part 49 is arranged on the Z-axis direction one side, i.e., at a portion near the second wall part 43. The worm accommodating part 49 is arranged near the worm wheel accommodating part 45, and the insides of these accommodating parts 49 and 45 communicate with each other in the vicinity of the meshed portion between the worm 35 and the tooth part 46a.

The worm accommodating part 49 extends in the axial direction (X-axis direction, left-right direction in FIG. 4) of the rotating shaft 34, and the second metal BR2 which rotatably supports the axial tip side of the rotating shaft 34 is accommodated on the X-axis direction one side (left side in FIG. 4) of the worm accommodating part 49.

Furthermore, the bearing mounting part 50 is provided on the inner side of the housing 41. The bearing mounting part 50 is arranged on the X-axis direction other side (right side in FIG. 4) of the worm accommodating part 49 and opens toward the yoke 31. The ball bearing 36 is accommodated inside the bearing mounting part 50, and the axial tip side (X-axis direction one side, left side in FIG. 4) of the rotating shaft 34 in the outer race 36b of the ball bearing 36 is supported by the bearing mounting part 50.

A bearing support ring RG formed in a substantially tubular shape is fixed to the bearing mounting part 50 by press fitting. The bearing support ring RG is formed of, for example, a sintered material obtained by compacting metal powder. The outer race 36b of the ball bearing 36 is arranged on the radially inner side of the bearing support ring RG with a minute gap (not shown) present therebetween.

Herein, as shown in FIG. 4, the axial base end side (X-axis direction other side, right side in FIG. 4) of the rotating shaft 34 is rotatably supported by the first metal BR1 mounted at the bottom wall part 31b of the yoke 31. Further, the axial tip side (X-axis direction one side, left side in FIG. 4) of the rotating shaft 34 is rotatably supported by the second metal BR2 mounted at the worm accommodating part 49 of the housing 41. The axial middle part of the rotating shaft 34 is rotatably supported by the ball bearing 36 accommodated in the bearing mounting part 50.

That is, the rotating shaft 34 is supported at three points by three bearings (first metal BR1, second metal BR2, and ball bearing 36). Accordingly, during operation of the sunroof motor 20, the worm 35 is prevented from being separated from the tooth part 46a of the worm wheel 46 (disengagement from each other), and the worm 35 and the tooth part 46a can be reliably meshed with each other.

The inner race 36a of the ball bearing 36 is fixed to the rotating shaft 34, and the outer race 36b of the ball bearing 36 is clamped by the bearing mounting part 50 and the bearing support member 37. Therefore, the rotating shaft 34 does not move in its axial direction. Accordingly, it is not necessary to provide thrust bearings on axial two sides of the rotating shaft 34, and thus it is possible to reduce the number of parts.

On the other hand, to have the rotating shaft 34 supported at three points while rotating smoothly, it is required to improve the precision of the parts forming the sunroof motor 20. However, such an improvement in the precision of parts is not realistic because it complicates the manufacturing process and increases the product cost. Therefore, in this embodiment, the ball bearing 36 (outer race 36b) is arranged on the radially inner side of the bearing support ring RG with a minute gap present therebetween.

Accordingly, the minute gap absorbs manufacturing errors of the parts and absorbs linear expansion differences between the parts, so that the rotating shaft 34 can be rotated smoothly. Thus, the "minute gap" formed between the bearing support ring RG and the outer race 36b has a function of absorbing manufacturing errors of the parts or linear expansion differences between the parts forming the sunroof motor 20.

Further, as shown in FIG. 4 and FIG. 5, a motor accommodating part 51 is provided on the inner side of the housing 41. The motor accommodating part 51 is arranged on the yoke 31 side (X-axis direction other side) of the bearing mounting part 50 in the axial direction of the rotating shaft 34. In FIG. 5, to facilitate understanding of the shape of the motor accommodating part 51, illustration of its detailed structure on the inner side is omitted.

A part of the electric motor part 30 is accommodated in the motor accommodating part 51. Specifically, as shown in FIG. 4, the mounting wall part 37b of the bearing support member 37 forming the electric motor part 30 is accommodated in the motor accommodating part 51 without rattling.

As shown in FIG. 5, the motor accommodating part 51 includes a first accommodating wall 51a, a second accommodating wall 51b, a third accommodating wall 51c, and a fourth accommodating wall 51d. The motor accommodating part 51 is formed by these accommodating walls 51a, 51b, 51c, and 51d into a box shape having a substantially rectangular cross section.

Specifically, the first accommodating wall 51a forms a surface extending in the X-axis direction and the Z-axis direction (see FIG. 8), similarly to the first wall part 42. The second accommodating wall 51b forms a surface extending in the X-axis direction and the Y-axis direction (see FIG. 8), similarly to the second wall part 43. The third accommodating wall 51c is arranged on a side opposite to the first wall part 42 side in the Y-axis direction. The fourth accommodating wall 51d is arranged between the second wall part 43 and the third wall part 44 in the Z-axis direction.

Herein, as shown in FIG. 5, a first screw hole H1 which extends in the X-axis direction and into which the first fastening screw S1 (see FIG. 2) is screwed is provided at a connected portion (upper left corner in FIG. 5) between the second accommodating wall 51b and the third accommodating wall 51c. A second screw hole H2 which extends in the X-axis direction and into which the second fastening screw S2 (see FIG. 2) is screwed is provided at a connected portion (lower right corner in FIG. 5) between the fourth accommodating wall 51d and the first accommodating wall 51a.

[Metal Jacket]

As shown in FIG. 2 to FIG. 9, a metal jacket 60 is mounted at an outer portion of the sunroof motor 20. The metal jacket 60 has a function of preventing electrical noise generated inside the sunroof motor 20 from being radiated to the outside of the housing 41. Specifically, the metal jacket 60 has a function of receiving electrical noise that is to escape to around the housing 41 made of a resin material and releasing it to the vehicle body via the yoke 31.

The metal jacket 60 is formed of a plurality of conductive plates, and specifically includes a first conductive plate 61 and a second conductive plate 62. The first conductive plate 61 and the second conductive plate 62 are each formed into a predetermined shape by pressing a thin steel plate (magnetic body) made of a material having excellent conductivity. Herein, in FIG. 2, FIG. 3, FIG. 6, FIG. 8, and FIG. 9, to facilitate understanding of the shapes of the first conductive plate 61 and the second conductive plate 62, the first conductive plate 61 and the second conductive plate 62 are hatched.

[First Conductive Plate]

As shown in FIG. 8, the first conductive plate (conductive plate) 61 includes a first covering part 61a covering the second wall part 43 of the housing 41, a second covering part 61b covering the Y-axis direction other side (left side in FIG. 5) of the second accommodating wall 51b, and a third covering part 61c covering the third accommodating wall 51c (see FIG. 5). The first covering part 61a and the second covering part 61b are connected to each other and arranged in a stepped manner in the X-axis direction.

A first fixing part 61d is integrally provided on the Y-axis direction one side (lower right side in FIG. 8) of the first covering part 61a to protrude toward the Z-axis direction other side (lower side in FIG. 8). The first fixing part 61d is fixed to the housing 41 by a first fixing member 42a and a second fixing member 42b provided at the first wall part 42 of the housing 41. Specifically, the first fixing part 61d is provided with a pair of notch grooves G which are opened on the Z-axis direction other side and into which the first fixing member 42a and the second fixing member 42b are respectively inserted.

Herein, the first fixing member 42a and the second fixing member 42b provided at the first wall part 42 are formed in a substantially cylindrical shape and protrude toward the Y-axis direction one side at a predetermined height. The first fixing member 42a and the second fixing member 42b correspond to a fixing member in the disclosure, and are melted and deformed by pressing a heating tool TL shown in FIG. 7 and FIG. 9.

Furthermore, a second fixing part 61e is integrally provided on the X-axis direction one side (lower left side in FIG. 8) of the second covering part 61b to protrude toward the Z-axis direction other side. The second fixing part 61e is a portion fixed to the housing 41 together with the yoke 31 by the first fastening screw S1. The second fixing part 61e is provided with a screw hole HA through which the first fastening screw S1 is inserted. That is, the first conductive plate 61 is fixed to the housing 41 by the first fastening screw S1 which fixes the yoke 31 to the housing 41.

Thus, the first conductive plate 61 is fixed to the housing 41 at a total of three points including the first fixing member 42a, the second fixing member 42b, and the first fastening screw S1, and the first conductive plate 61 is electrically connected to the yoke 31 via the second fixing part 61e.

Further, the third covering part 61c is integrally provided on the Y-axis direction other side (upper left side in FIG. 8) of the second covering part 61b and extends toward the Z-axis direction other side. Specifically, the third covering part 61c is bent at a substantially right angle (approximately 90°) with respect to the second covering part 61b, and the third covering part 61c is in a cantilevered state with respect to the second covering part 61b. However, the angle formed by the third covering part 61c and the second covering part 61b may be a right angle or less (90° or less). In this case, the third covering part 61c can be pressed against the third accommodating wall 51c, and thus the third covering part 61c can be reliably prevented from rattling.

As shown in FIG. 6, the first conductive plate 61 covers a portion (a portion that enters the housing 41) of the three-phase coils CL protruding from the yoke 31 in the radial direction of the rotating shaft 34. Further, the first conductive plate 61 partially covers the total of three conductive members 38 in the radial direction of the rotating shaft 34. Accordingly, the electrical noise that is to be radiated to the outside from a portion of the three-phase coils CL and a portion of the total of three conductive members 38 is received by the first conductive plate 61.

[Second Conductive Plate]

As shown in FIG. 9, the second conductive plate (conductive plate) 62 includes a fourth covering part 62a covering the first wall part 42 of the housing 41, a fifth covering part 62b covering the first accommodating wall 51a, and a sixth covering part 62c covering the Y-axis direction one side (right side in FIG. 5) of the second accommodating wall 51b. The fourth covering part 62a and the fifth covering part 62b are connected to each other and arranged in a stepped manner in the X-axis direction.

A support part 62d recessed in a stepped manner toward the first wall part 42 is provided on the X-axis direction other side (upper right side in FIG. 9) of the fourth covering part 62a. The support part 62d is a portion supported by a protrusion 42e provided at the first wall part 42 of the housing 41. Accordingly, with the second conductive plate 62 being mounted to the housing 41 (first wall part 42), the fourth covering part 62a is slightly warped. That is, the fourth covering part 62a is elastically deformed by the protrusion 42e. Therefore, rattling on the tip side (support part 62d side) of the fourth covering part 62a is effectively suppressed.

Further, a first insertion hole 62e and a second insertion hole 62f are provided on the Z-axis direction one side (upper side in FIG. 9) of the fourth covering part 62a and arranged in the X-axis direction. The first fixing member 42a provided at the first wall part 42 is inserted through the first insertion hole 62e, and the second fixing member 42b provided at the first wall part 42 is inserted through the second insertion hole 62f.

A third insertion hole 62g and a fourth insertion hole 62h are also provided on the Z-axis direction other side (lower side in FIG. 9) of the fourth covering part 62a and arranged in the X-axis direction. A third fixing member 42c and a fourth fixing member 42d provided at the first wall part 42 are respectively inserted through the third insertion hole 62g and the fourth insertion hole 62h.

Herein, the third fixing member 42c and the fourth fixing member 42d correspond to a second conductive plate fixing member in the disclosure. That is, the third fixing member 42c and the fourth fixing member 42d are fixing members dedicated to the second conductive plate 62 for fixing the second conductive plate 62 to the housing 41 (first wall part 42).

Similarly to the first fixing member 42a and the second fixing member 42b, the third fixing member 42c and the fourth fixing member 42d are formed in a substantially cylindrical shape and protrude toward the Y-axis direction one side at a predetermined height. The third fixing member 42c and the fourth fixing member 42d are also melted and deformed by pressing the heating tool TL shown in FIG. 7 and FIG. 9.

More specifically, as shown in FIG. 5, when the rotating shaft 34 is viewed from the radially outer side (direction of arrow C), the first fixing member 42a and the second fixing member 42b are arranged on one side (Z-axis direction one side) of the rotating shaft 34, and the third fixing member 42c and the fourth fixing member 42d are arranged on another side (Z-axis direction other side) of the rotating shaft 34. Accordingly, the fourth covering part 62a, which is longer in the X-axis direction, can be fixed to the first wall part 42 without rattling and can be arranged along the rotating shaft 34 (worm 35).

Thus, the second conductive plate 62 is fixed to the housing 41 at a total of four points, including the first fixing member 42a, the second fixing member 42b, the third fixing member 42c, and the fourth fixing member 42d, and the second conductive plate 62 is electrically connected to the first conductive plate 61 at a portion of the first fixing member 42a and the second fixing member 42b. That is, the first fixing member 42a and the second fixing member 42b have a function of respectively electrically connecting the first conductive plate 61 and the second conductive plate 62 and collectively fixing the first conductive plate 61 and the second conductive plate 62 to the housing 41 (first wall part 42).

Therefore, the second conductive plate 62 is electrically connected to the yoke 31 via the first conductive plate 61. As shown in FIG. 6, the second conductive plate 62 covers a portion (a portion that enters the housing 41) of the three-phase coils CL protruding from the yoke 31 in the radial direction of the rotating shaft 34. Further, the second conductive plate 62 partially covers the rotating shaft 34 (worm 35) in the radial direction of the rotating shaft 34. Accordingly, the electrical noise that is to be radiated to the outside from a portion of the three-phase coils CL and a portion of the rotating shaft 34 (worm 35) is received by the second conductive plate 62.

Thus, the metal jacket 60 composed of the first conductive plate 61 and the second conductive plate 62 covers metal (magnetic body) parts that propagate electrical noise at the outer portion of the housing 41 made of a resin material such as plastic. Therefore, the electrical noise to be radiated to the outside of the housing 41 is received by the metal jacket 60 (first conductive plate 61 and second conductive plate 62) and released (grounded) to the vehicle body via the yoke 31.

[Assembly Procedure]

Next, a procedure for assembling the sunroof motor 20 formed as described above, specifically, a procedure for mounting the metal jacket 60 (first conductive plate 61 and second conductive plate 62) to the housing 41 will be described in detail with reference to the drawings.

First, the first conductive plate 61 is brought to face the second wall part 43 of the housing 41 as indicated by an arrow M1 in FIG. 8. Specifically, the first covering part 61a of the first conductive plate 61 is oriented toward the second wall part 43 from the Z-axis direction one side (upper side in FIG. 8), and the second covering part 61b of the first conductive plate 61 is oriented toward the second accommodating wall 51b from the Z-axis direction one side.

Accordingly, the first covering part 61a is mounted to the second wall part 43, and the second covering part 61b is mounted to the second accommodating wall 51b. Further, the third covering part 61c is mounted to the third accommodating wall 51c (see FIG. 5). At that time, the first fixing member 42a and the second fixing member 42b respectively enter the pair of notch grooves G provided at the first fixing part 61d of the first conductive plate 61. Furthermore, the screw hole HA provided at the second fixing part 61e of the first conductive plate 61 is arranged coaxially with and opposed to the screw hole ha provided at the yoke 31.

Afterwards, as indicated by arrows M2 and M3 in FIG. 8, the first fastening screw S1 and the second fastening screw S2 are respectively screwed into the first screw hole H1 and the second screw hole H2 (see FIG. 5) provided at the housing 41 from the X-axis direction one side (lower left side in FIG. 8) by using a fastening tool (not shown). Accordingly, the yoke 31 is fixed to the housing 41, the first conductive plate 61 is electrically connected to the yoke 31, and temporary fixing of the first conductive plate 61 to the housing 41 by the first fastening screw S1 is completed.

Next, the second conductive plate 62 is brought to face the first wall part 42 of the housing 41 as indicated by an arrow M4 in FIG. 9. Specifically, the fourth covering part 62a of the second conductive plate 62 is oriented toward the first wall part 42 from the Y-axis direction one side (lower right side in FIG. 9), and the fifth covering part 62b of the second conductive plate 62 is oriented toward the first accommodating wall 51a from the Y-axis direction one side.

Accordingly, the fourth covering part 62a is mounted to the first wall part 42, and the fifth covering part 62b is mounted to the first accommodating wall 51a. Further, the sixth covering part 62c is mounted to the second accommodating wall 51b. At that time, the first fixing member 42a and the second fixing member 42b are respectively inserted through the first insertion hole 62e and the second insertion hole 62f provided at the fourth covering part 62a of the second conductive plate 62. The third fixing member 42c and the fourth fixing member 42d are respectively inserted through the third insertion hole 62g and the fourth insertion hole 62h provided at the fourth covering part 62a of the second conductive plate 62. Further, the support part 62d of the fourth covering part 62a abuts against the protrusion 42e of the housing 41.

Afterwards, as indicated by arrow M5 in FIG. 7 and FIG. 9, the tip portion of the heating tool TL is pressed against the tip portions of the first to fourth fixing members 42a to 42d to melt the tip portions of the first to fourth fixing members 42a to 42d. Accordingly, the tip portions of the first to fourth fixing members 42a to 42d are deformed to prevent slipping out of the first to fourth insertion holes 62e to 62h. Accordingly, full fixing of the first conductive plate 61 and the second conductive plate 62 to the housing 41 is completed, and the first conductive plate 61 and the second conductive plate 62 are electrically connected to each other while the support part 62d is in elastic contact with the protrusion 42e.

Accordingly, mounting of the metal jacket 60 (first conductive plate 61 and second conductive plate 62) to the housing 41 is completed.

As described in detail above, according to this embodiment, since the first conductive plate 61 and the second conductive plate 62 are provided to cover the housing 41, it is possible to prevent electrical noise from being radiated to the outside of the housing 41, and thus it is possible to take more sufficient countermeasures against electrical noise. Therefore, it is possible to further suppress adverse effects on in-vehicle equipment such as a car audio. In addition, since the first conductive plate 61 and the second conductive plate 62 are respectively electrically connected and collectively fixed by the first fixing member 42a and the second fixing member 42b, the assemblability of the sunroof motor 20 can also be improved.

Further, according to this embodiment, the electric motor part 30 includes the total of three conductive members 38, which supply drive currents to the three-phase coils CL, and the worm 35 which forms the speed reduction mechanism SD. The metal jacket 60 includes the first conductive plate 61 and the second conductive plate 62. In the radial direction of the rotating shaft 34, the first conductive plate 61 partially covers the three-phase coils CL and the three conductive members 38, and the second conductive plate 62 partially covers the three-phase coils CL and the worm 35.

Accordingly, the electrical noise that is to be radiated to the outside of the housing 41 from a portion of the three-phase coils CL, a portion of the total of three conductive members 38, and a portion of the worm 35 is received by the metal jacket 60, and thus most of the electrical noise can be released (grounded) to the vehicle body via the yoke 31.

Furthermore, according to this embodiment, the electric motor part 30 includes the yoke 31 accommodating the stator 32 around which the three-phase coils CL are respectively wound. The first conductive plate 61 is fixed to the housing 41 by the first fastening screw S1 which fixes the yoke 31 to the housing 41.

Accordingly, the yoke 31 and the first conductive plate 61 can be electrically connected to each other reliably. In addition, since it is not necessary to separately fix the first conductive plate 61 using a separate fastening screw, it is possible to suppress an increase in the number of parts and complication of assembly.

Further, according to this embodiment, when the rotating shaft 34 is viewed from the radially outer side (direction of arrow C in FIG. 5), the first fixing member 42a and the second fixing member 42b are arranged on one side (Z-axis direction one side) of the rotating shaft 34, and the third fixing member 42c and the fourth fixing member 42d dedicated to the second conductive plate 62 for fixing the second conductive plate 62 to the housing 41 are arranged on another side (Z-axis direction other side) of the rotating shaft 34.

Accordingly, the fourth covering part 62a, which is longer in the X-axis direction (axial direction of rotating shaft 34), can be fixed to the first wall part 42 without rattling and can be arranged along the rotating shaft 34 (worm 35).

Furthermore, according to this embodiment, since it is possible to suppress an increase in the number of parts and complication of assembly as described above, it is possible to save manufacturing energy, which will make it possible to achieve, in particular, Goal 7 (ensure access to affordable, reliable, sustainable and modern energy for all) and Goal 13 (take urgent action to combat climate change and its impacts) of the Sustainable Development Goals (SDGs) set forth by the United Nations.

Embodiment 2

Next, Embodiment 2 of the disclosure will be described in detail with reference to the drawings. Portions having functions similar to those of Embodiment 1 will be labeled with the same reference signs, and detailed descriptions thereof will be omitted.

Figure 10:
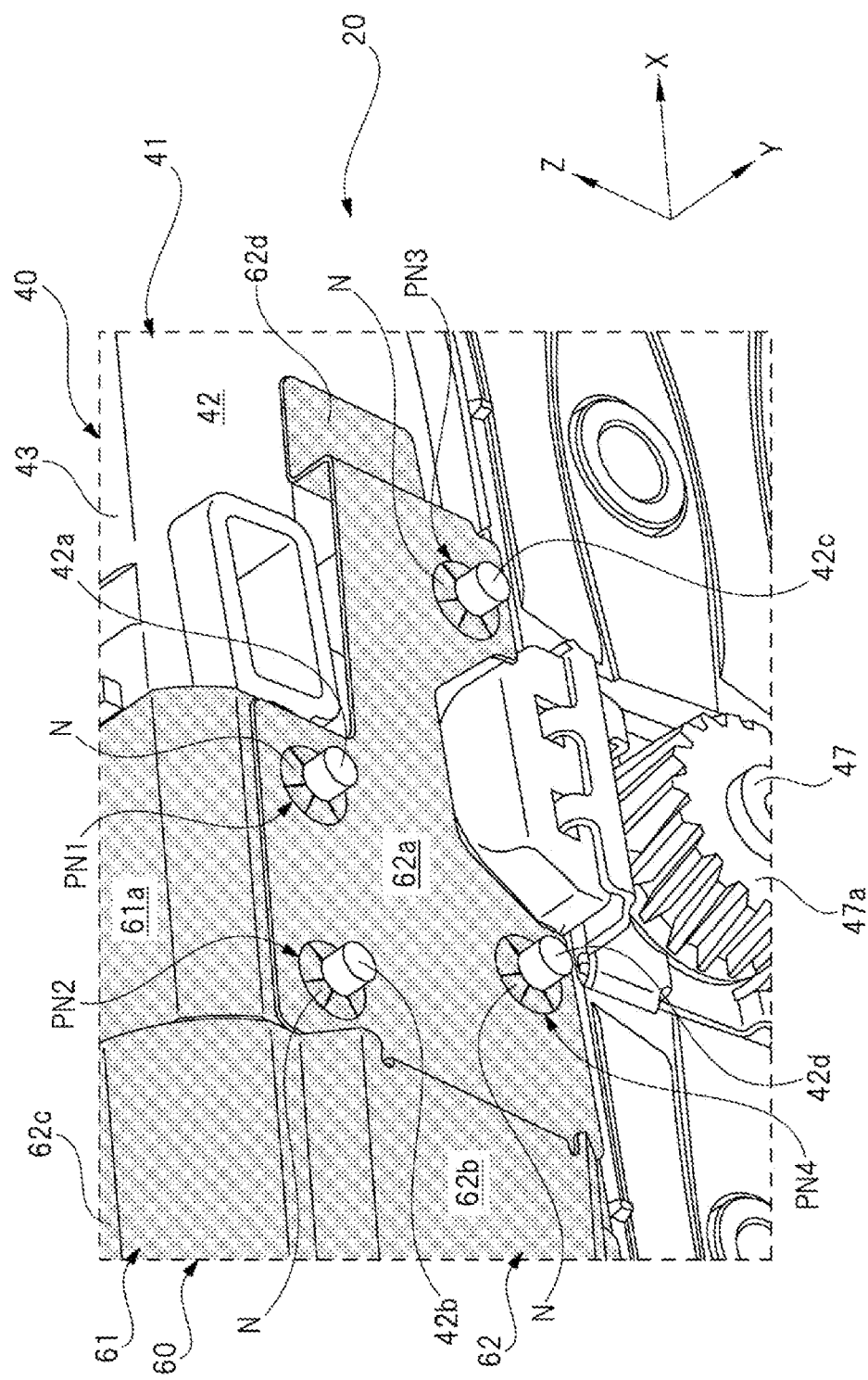
FIG. 10 is a partially enlarged perspective view corresponding to FIG. 2 showing Embodiment 2.
Figure 11:
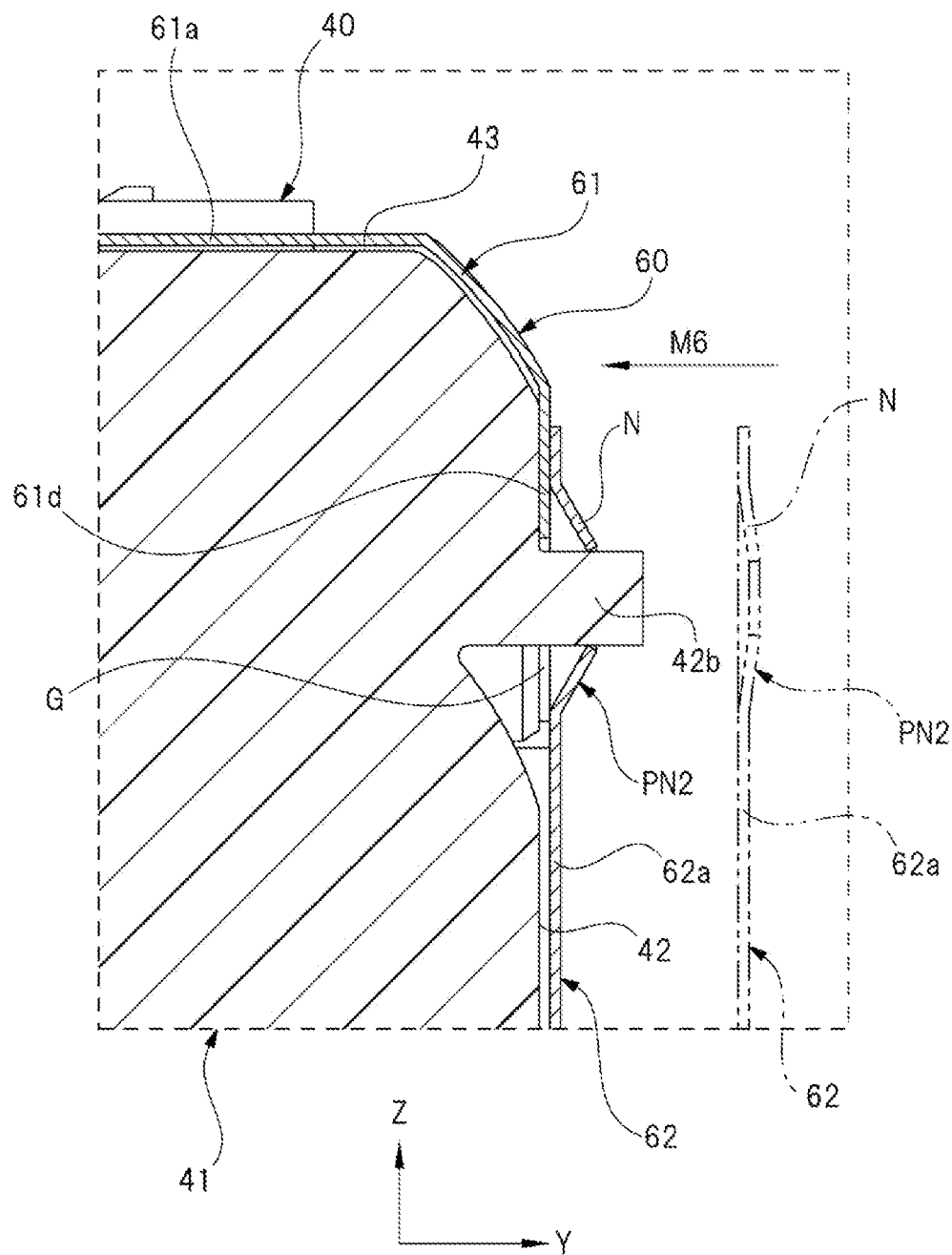
FIG. 11 is a partially enlarged cross-sectional view corresponding to FIG. 7 showing Embodiment 2.

FIG. 10 is a partially enlarged perspective view corresponding to FIG. 2 showing Embodiment 2. FIG. 11 is a partially enlarged cross-sectional view corresponding to FIG. 7 showing Embodiment 2.

As shown in FIG. 10, Embodiment 2 differs from Embodiment 1 only in the structure of the fixing members. Specifically, in Embodiment 1, as shown in FIG. 7 and FIG. 9, the tip portions of the first to fourth fixing members 42a to 42d are crushed and melted using the heating tool TL to fully fix the first conductive plate 61 and the second conductive plate 62 to the housing 41. In other words, in Embodiment 1, a heat-welding fixing structure is adopted. On the other hand, in Embodiment 2, a push nut-type fixing structure is adopted.

As shown in FIG. 10, in Embodiment 2, instead of the first to fourth insertion holes 62e to 62h (see FIG. 9) in Embodiment 1, a total of four push nut parts for shaft, i.e., first to fourth push nut parts PN1 to PN4 are provided. Specifically, the first push nut part PN1 is provided corresponding to the first fixing member 42a, the second push nut part PN2 is provided corresponding to the second fixing member 42b, the third push nut part PN3 is provided corresponding to the third fixing member 42c, and the fourth push nut part PN4 is provided corresponding to the fourth fixing member 42d.

A plurality of claws N inclined toward the axial tip side of the first to fourth fixing members 42a to 42d are provided at inner peripheral portions of the first to fourth push nut parts PN1 to PN4. Accordingly, with the first to fourth push nut parts PN1 to PN4 being mounted to the first to fourth fixing members 42a to 42d, the plurality of claws N respectively bite into the first to fourth fixing members 42a to 42d. As a result, the second conductive plate 62 does not come off from the housing 41 even if a force acts on the second conductive plate 62 in a direction removing from the housing 41.

Herein, in Embodiment 2, the first push nut part PN1, the second push nut part PN2, the first fixing member 42a, and the second fixing member 42b correspond to the fixing member in the disclosure. Further, the third push nut part PN3, the fourth push nut part PN4, the third fixing member 42c, and the fourth fixing member 42d correspond to the second conductive plate fixing member in the disclosure.

Then, as indicated by an arrow M6 in FIG. 11, the fourth covering part 62a of the second conductive plate 62 is brought to face the first wall part 42 of the housing 41 from the Y-axis direction one side (right side in FIG. 11) to mount the first to fourth push nut parts PN1 to PN4 respectively to the first to fourth fixing members 42a to 42d. At this time, the second conductive plate 62 is oriented so that the plurality of claws N are inclined toward the Y-axis direction one side. Further, the vicinity of the first to fourth push nut parts PN1 to PN4 of the second conductive plate 62 is strongly pressed toward the Y-axis direction other side (left side in FIG. 11) to keep the second conductive plate 62 from rattling.

Accordingly, full fixing of the first conductive plate 61 and the second conductive plate 62 to the housing 41 is completed, and the first conductive plate 61 and the second conductive plate 62 are electrically connected to each other while the support part 62d is in elastic contact with the protrusion 42e (see FIG. 9).

Embodiment 2 formed as described above also has the same effect as Embodiment 1 described above. In addition to this, in Embodiment 2, when the metal jacket 60 (first conductive plate 61 and second conductive plate 62) is mounted to the housing 41, since it is not necessary to use the heating tool TL (see FIG. 7 and FIG. 9), it is possible to improve the assemblability and further reduce the manufacturing energy.

Embodiment 3

Next, Embodiment 3 of the disclosure will be described in detail with reference to the drawings. Portions having functions similar to those of Embodiment 1 will be labeled with the same reference signs, and detailed descriptions thereof will be omitted.

Figure 12:
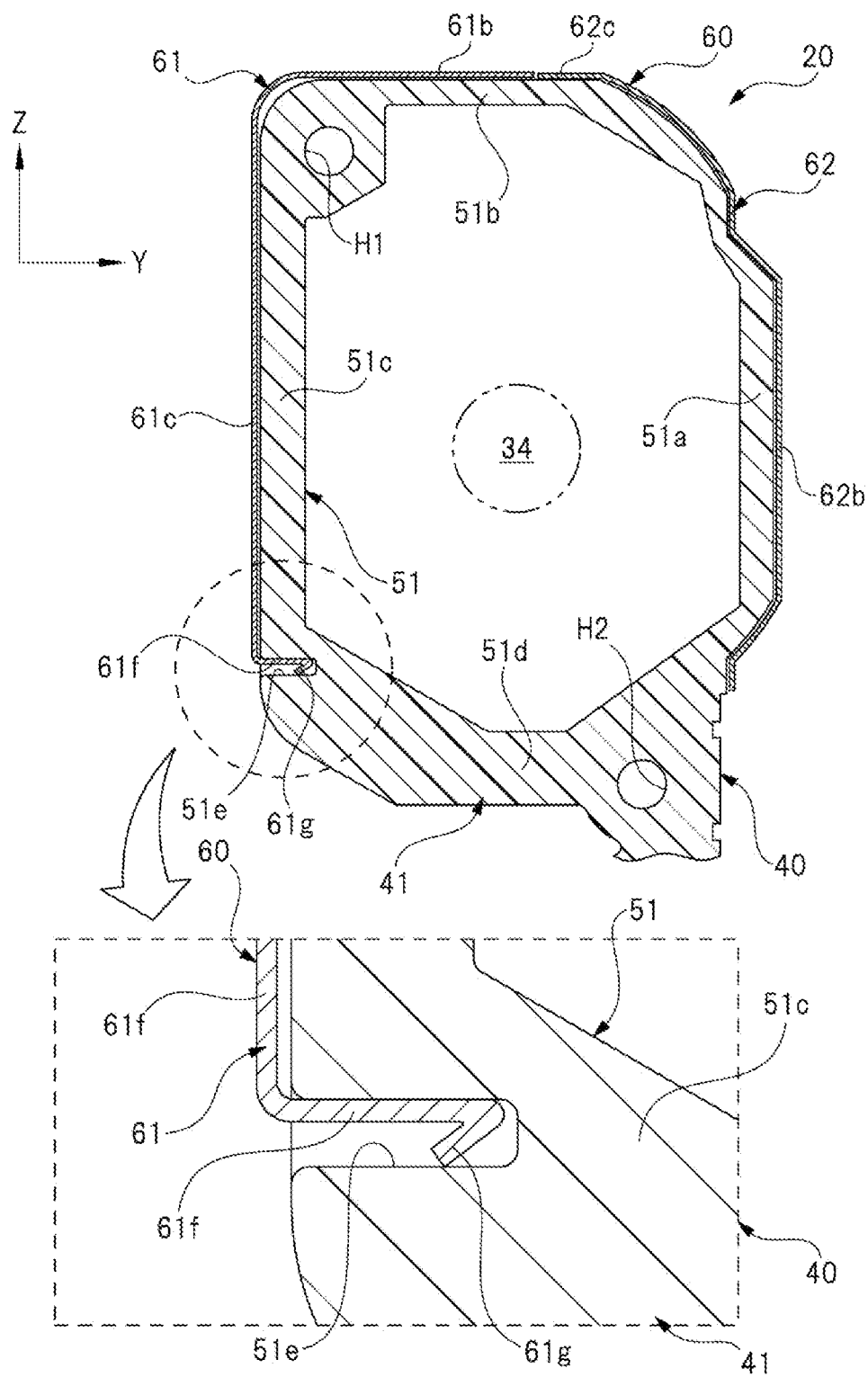
FIG. 12 is a partial cross-sectional view corresponding to FIG. 5 showing Embodiment 3.

FIG. 12 is a partial cross-sectional view corresponding to FIG. 5 showing Embodiment 3.

As shown in FIG. 12, Embodiment 3 differs from Embodiment 1 only in the fixing structure of the first conductive plate 61 to the housing 41. Specifically, in Embodiment 1, fixing is performed at a total of three points including the first fastening screw S1, the first fixing member 42a, and the second fixing member 42b (see FIG. 2), and in Embodiment 3, a further fixing portion at another position is added.

As shown in FIG. 12, at a portion of the first conductive plate 61 on the tip side of the third covering part 61c (a portion on the Z-axis direction other side), an engaging protrusion 61f is integrally provided to protrude toward the Y-axis direction one side (right side in FIG. 12). The engaging protrusion 61f is formed by folding back a tip side portion of the third covering part 61c at a right angle (90°).

A hooking claw 61g is integrally provided at a portion on the tip side of the engaging protrusion 61f (a portion on the Y-axis direction one side). The hooking claw 61g is folded back toward the base end side (Y-axis direction other side) of the engaging protrusion 61f, and is hooked to an engaging recess 51e of the housing 41 into a come-off prevention state.

The third accommodating wall 51c of the housing 41 is provided with an engaging recess 51e into which the engaging protrusion 61f is inserted, and the engaging recess 51e is recessed toward the Y-axis direction one side at a predetermined depth. When the engaging protrusion 61f (hooking claw 61g) is inserted into the engaging recess 51e, the hooking claw 61g elastically contacts and bites into the inner wall of the engaging recess 51e. Accordingly, the hooking claw 61g is hooked on the engaging recess 51e, and the third covering part 61c of the first conductive plate 61 is brought into a come-off prevention state with respect to the third accommodating wall 51c of the housing 41.

Embodiment 3 formed as described above also has the same effect as Embodiment 1 described above. In addition to this, in Embodiment 3, since the first conductive plate 61 is provided with the engaging protrusion 61f, and the engaging protrusion 61f is inserted into the engaging recess 51e provided at the housing 41, it is further possible to mount the first conductive plate 61 to the housing 41 without rattling. In particular, rattling on the tip side of the third covering part 61c can be effectively suppressed, and thus noise from the sunroof motor 20 can be further suppressed.

Obviously, the disclosure is not limited to the above-described embodiments, and various modifications may be made without departing from the spirit of the disclosure. In each of the above embodiments, although the disclosure is applied to the sunroof motor 20 used in the sunroof device 10 of the vehicle 12, the disclosure is not limited thereto, and for example, the disclosure may also be applied to an in-vehicle motor (motor device) used in a sliding door device, a power window device, a wiper device, etc. mounted on a vehicle.

In addition, the material, shape, dimension, number, installation position, etc. of each component in the above embodiments are arbitrary as long as the disclosure can be achieved, and are not limited to the above embodiments.

What is claimed is:

1. A motor device comprising:
   a motor comprising a rotating shaft;
   a speed reduction mechanism which reduces speed of rotation of the rotating shaft; and
   a housing which accommodates the speed reduction mechanism,
   the motor device further comprising:
   a plurality of conductive plates covering the housing to prevent electrical noise from being radiated to outside of the housing; and
   a fixing member which is provided at the housing, electrically connects each of the plurality of conductive plates, and collectively fixes the plurality of conductive plates to the housing, wherein
   the motor comprises a terminal member which supplies a drive current to a coil, and a worm which forms the speed reduction mechanism,
   the plurality of conductive plates comprise a first conductive plate and a second conductive plate, and
   in a radial direction of the rotating shaft, the first conductive plate covers the coil and the terminal member, and the second conductive plate covers the coil and the worm.

2. The motor device according to claim 1, wherein
   the motor comprises a yoke which accommodates a stator wound with the coil, and
   the first conductive plate is fixed to the housing by a fastening member which fixes the yoke to the housing.

3. The motor device according to claim 1, wherein
   when the rotating shaft is viewed from a radially outer side, the fixing member is arranged on one side of the rotating shaft, and a second conductive plate fixing member for fixing the second conductive plate to the housing is arranged on another side of the rotating shaft.

4. The motor device according to claim 1, wherein
   an engaging protrusion is provided at the first conductive plate, and the engaging protrusion is inserted into an engaging recess provided at the housing.

* * * * *